United States Patent
Baqai et al.

(10) Patent No.: US 8,108,211 B2
(45) Date of Patent: Jan. 31, 2012

(54) METHOD OF AND APPARATUS FOR ANALYZING NOISE IN A SIGNAL PROCESSING SYSTEM

(75) Inventors: Farhan A. Baqai, Fremont, CA (US); Akira Matsui, Kanagawa (JP); Kenichi Nishio, Yokohama (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 865 days.

(21) Appl. No.: 11/731,261

(22) Filed: Mar. 29, 2007

(65) Prior Publication Data

US 2008/0240203 A1 Oct. 2, 2008

(51) Int. Cl.
*G10L 21/02* (2006.01)
(52) U.S. Cl. .......... 704/226; 704/200; 704/214
(58) Field of Classification Search .......... 704/229, 704/200, 203, 205, 226, 220, 200.1, 228, 704/210, 208, 227, 214, 215, 225; 381/321; 379/406.1
See application file for complete search history.

(56) References Cited

U.S. PATENT DOCUMENTS

| | | | |
|---|---|---|---|
| 3,971,065 A | 7/1976 | Bayer | 358/41 |
| 4,142,071 A | 2/1979 | Croisier et al. | 179/15.55 |
| 5,012,333 A | 4/1991 | Lee et al. | |
| 6,098,038 A * | 8/2000 | Hermansky et al. | 704/226 |
| 6,148,103 A | 11/2000 | Nenonen | |
| 6,226,321 B1 | 5/2001 | Michels et al. | 375/227 |
| 6,377,637 B1 | 4/2002 | Berdugo | 375/346 |
| 6,480,610 B1 * | 11/2002 | Fang et al. | 381/321 |
| 6,691,086 B2 * | 2/2004 | Lokhoff et al. | 704/229 |
| 6,813,389 B1 | 11/2004 | Gindele et al. | |
| 7,072,511 B2 | 7/2006 | Tan et al. | |
| 7,133,824 B2 * | 11/2006 | Wu et al. | 704/226 |
| 7,209,567 B1 * | 4/2007 | Kozel et al. | 381/94.3 |
| 7,636,436 B2 * | 12/2009 | Chen et al. | 379/406.1 |
| 7,885,462 B2 | 2/2011 | Paik | |

(Continued)

FOREIGN PATENT DOCUMENTS

CN 1460323 12/2003

(Continued)

OTHER PUBLICATIONS

Jansen Maarten et al/, "Image de-noise by integer wavelet transforms and generalized cross validation", pp. 622-630, Medical Physics vol. 26 No. 4 Apr. 1, 1999.

(Continued)

*Primary Examiner* — Huyen X. Vo
(74) *Attorney, Agent, or Firm* — Haverstock & Owens LLP

(57) ABSTRACT

A fast accurate multi-channel frequency dependent scheme for analyzing noise in a signal processing system is described herein. Noise is decomposed within each channel into frequency bands and sub-band noise is propagated. To avoid the computational complexity of a convolution, traditional methods either assume the noise to be white, at any point in the signal processing pipeline, or they just ignore spatial operations. By assuming the noise to be white within each frequency band, it is possible to propagate any type of noise (white, colored, Gaussian, non-Gaussian and others) across a spatial transformation in a very fast and accurate manner. To demonstrate the efficacy of this technique, noise propagation is considered across various spatial operations in an image processing pipeline. Furthermore, the computational complexity is a very small fraction of the computational cost of propagating an image through a signal processing system.

26 Claims, 10 Drawing Sheets

U.S. PATENT DOCUMENTS

| | | | |
|---|---|---|---|
| 2002/0015528 A1 | 2/2002 | Kondo et al. | 382/224 |
| 2003/0039401 A1 | 2/2003 | Gallagher et al. | |
| 2003/0138141 A1 | 7/2003 | Quan et al. | 382/162 |
| 2003/0152283 A1 | 8/2003 | Moriwaki | |
| 2003/0161549 A1 | 8/2003 | Lei et al. | |
| 2003/0190090 A1 | 10/2003 | Beeman et al. | |
| 2003/0202693 A1 | 10/2003 | Nakajima et al. | |
| 2003/0235343 A1 | 12/2003 | Kagaya | |
| 2004/0019492 A1 | 1/2004 | Tucker et al. | 704/500 |
| 2004/0071363 A1 | 4/2004 | Kouri et al. | |
| 2004/0212692 A1 | 10/2004 | Nakami et al. | |
| 2004/0252208 A1 | 12/2004 | Lee | |
| 2005/0062861 A1 | 3/2005 | Hamasaki | |
| 2005/0099515 A1 | 5/2005 | Tsuruoka | 348/241 |
| 2006/0204124 A1 | 9/2006 | Aihara | |
| 2007/0040914 A1 | 2/2007 | Katagiri et al. | |
| 2007/0104387 A1 | 5/2007 | Han et al. | |
| 2009/0021648 A1 | 1/2009 | Shin et al. | |
| 2009/0161982 A1 | 6/2009 | Tico et al. | |

FOREIGN PATENT DOCUMENTS

| | | |
|---|---|---|
| CN | 1675919 A | 9/2005 |
| JP | 07-249101 A | 9/1995 |
| JP | 2003284084 A | 3/2003 |
| JP | 2004208079 A | 7/2004 |
| JP | 2005-509167 A | 4/2005 |
| JP | 2005303803 A2 | 10/2005 |
| WO | WO 01/74058 A1 | 4/2001 |
| WO | 02/05262 A2 | 1/2002 |
| WO | WO 03/041390 A3 | 5/2003 |
| WO | 2005/029846 A1 | 3/2005 |
| WO | 2007/002406 A2 | 1/2007 |

OTHER PUBLICATIONS

Aghdasi, Farzin et al., Reduction of Boundary Artifacts in Image Restoration, IEE Transactions on Image Processing, vol. 3, No. 4, Apr. 1, 1996, pp. 611-618.

Shuxue Quan, "Evaluation and Optimal Design of Spectral Sensitivities for Digital Color Imaging", Apr. 2002, pp. 1-258, Center for Imaging Science, Rochester Institute of Technology.

Peter D Burns, 1,2* Roy S. Berns 1, "Error Propagation Analysis in Color Measurement and Imaging", Jan. 11, 1997, pp. 280-289, Munsell Color Science Laboratory, Center for Imaging Science Rochester Institute of Technology, Rochester, NY.

M. Rabbani and R. Van Metter, "Analysis of signal and noise propagation for several imaging mechanisms", J. Opt. Soc. Am A/vol. 6 No. 8/Aug. 1989, Apr. 11, 1989, pp. 1156-1164, Photographic Research Laboratories, Photographic Products Group, Eastman Kodak Company, Rochester New York.

J. Yao and I.A. Cunningham, "Parallel cascades: New ways to describe noise transfer in medical imaging systems", Jul. 23, 2001, pp. 2020-2038, AM. Assoc. Phys. Med., Ontario Canada.

Farhan A. Baqai and Jan P. Allebach "Computer-Aided Design of Clustered-Dot Color Screens Based on a Human Visual System Model", Proceedings of the IEEE, vol. 90. No. 1, Jan. 2002, pp. 104-122, West Lafayette, IN.

Farhan A. Baqai, Je-Ho Lee, A. Ufuk Agar, and Jan P. Allebach, "Digital Color Halftoning", Jan. 2005, pp. 87-96, IEEE Signal Processing Magazine.

Oded Ghitza, "Auditory Models and Human Performance in Tasks Related to Speech Coding and Speech Recognition:", IEEE Transactions on Speech and audio Processing, vol. 2 No. 1, Part II Jan. 1994, pp. 115-132.

Philippe Longere, Xuemei Zhang, Peter B. Delahunt and David H. Brainard, "Perceptual Assessment of Demosaicing Algorithm Performance:", Proceedings of the IEEE, Vo. 90. No. 1, Jan. 2002, pp. 123-132.

B.K. Gunturk, J. Goltzbach, Y. Altunbasak, R. W. Schafer, and R.M. Mersereau, Demosaicking: Color Filter Array Interpolation in Single-Chip Digital Cameras, pp. 1-20, Texas Instruments Leadership University Program.

C. Tomasi and R. Manduchi "Bilateral Filtering for Gray and Color Images", Proceedings of the 1998 IEEE International Conference on Computer Vision, Bombay, India.

Kristin J. McLoughlin, Philip J. Bones, Senior Member, IEEE, and Nico Karssemeijer, Noise Equalization for Detection of Microcalcification Clusters in Direct Digital Mammogram Images, IEEE Transactions on Medical Imaging, Vo.23.No. 3., Mar. 2004, pp. 313-320, New Zealand.

Po-Chieh Hung, Colorimetric calibration in electronic imaging devices using a look-up-table model and interpolations, Journal of Electronic Imaging 2(1), Jan. 1993, pp. 53-61, Konica Corporation Electronic Imaging Laboratories, No. 1 Sakura-machi, Hono-shi, Tokyo, 191 Japan.

Gene H. Golub, Charles F. Van Loan, "Matrix Computations", Third Addition 1996, Book, The John Hopkins University Press, Baltimore, Maryland.

Maarten Jansen, "Noise Reduction by Wavelet Thresholding", 2001, Book, Springer-Verlag New York, Inc.

Deng Xiuqin et al., "A new kind of weighted median filtering algorithm used for image Processing", IEEE Computer Science, 2008 International Symposium on Information Science and Engieering, pp. 738-743.

Wu Yifeng et al., "A Speckle Suppression Method for Sar Images Using Maximum Homogeneous Region Filter", pp. 2413-2416, 2002.

Antoni Buades et al., "A non-local algorithm for image denoising", 2005.

Vossepoel et al., "Adaptive Histogram Equalization Using Variable Regions," 9th International Conference on Pattern Recognition, 1988, vol. 1, pp. 351-353.

Larson et al., "A Visibility Matching Tome Reproduction Operator for High Dynamic Range Scenes",IEEE Transactions on Visualization and Computer Graphics, vol. 3, No. 4, Dec. 1997.

* cited by examiner

METHOD OF AND APPARATUS FOR ANALYZING NOISE IN A SIGNAL PROCESSING SYSTEM

FIELD OF THE INVENTION

The present invention relates to the field of signal processing. More specifically, the present invention relates to analyzing noise in a signal processing system.

BACKGROUND OF THE INVENTION

The analysis, propagation, and prediction of multivariate noise after a series of operations is a basic problem arising in many applications such as: audio signal processing, image denoising, digital imaging system design, seismic wave data analysis, and medical imaging. The signal processing steps that constitute these operations are able to be classified into three categories: linear, non-linear, and spatial. Existing methods are able to handle linear and non-linear transformations. However, they either ignore spatial signal processing steps, resulting in inaccurate noise propagation, or they employ convolution which is computationally very expensive. Therefore, they make the scheme impracticable for applications such as multi-parameter optimization, noise cancellation in audio, and predicting sub-band noise in real-time denoising.

If noise at the input of a spatial transformation is considered to be white, then the noise variance after filtering is able to simply be computed as the product of the input noise energy and the filter energy. Unfortunately, this assumption is not valid for most systems. Although the noise may be white at the beginning, its characteristics will change as it passes through a signal processing pipeline. Therefore, a mechanism is needed that is able to deal with both white and colored noise propagation.

SUMMARY OF THE INVENTION

A fast accurate multi-channel frequency dependent scheme for analyzing noise in a signal processing system is described herein. Noise is decomposed within each channel into frequency bands and sub-band noise is propagated. To avoid the computational complexity of a convolution, traditional methods either assume the noise to be white, at any point in the signal processing pipeline, or they just ignore spatial operations. By assuming the noise to be white within each frequency band, it is possible to propagate any type of noise (white, colored, Gaussian, non-Gaussian and others) across a spatial transformation in a very fast and accurate manner. To demonstrate the efficacy of this technique, noise propagation is considered across various spatial operations in an image processing pipeline. Furthermore, the computational complexity is a very small fraction of the computational cost of propagating an image through a signal processing system.

In one aspect, a method of analyzing noise in a signal comprises separating the noise into a plurality of sub-bands, determining a noise average for each of the sub-bands within the plurality of sub-bands and propagating the noise. The method further comprises receiving the signal containing the noise. The plurality of sub-bands are for each channel within a multi-channel system. Propagating the noise occurs in real-time. Alternatively, propagating the noise occurs offline. The method is applied in an application selected from the group consisting of digital image processing, sound processing, seismic wave data analysis and medical imaging. Preferably, each of the sub-bands are of equal width. The number of sub-bands depend on the desired accuracy. For image denoising, preferably the plurality of sub-bands is between 2 and 4, inclusive. However, any number of sub-bands is possible. The noise could be of any type: white noise, colored noise, Gaussian and non-Gaussian noise.

In another aspect, a method of analyzing noise comprises receiving a signal containing noise, decomposing the noise in each channel into a plurality of sub-bands, determining a noise average for each of the plurality of sub-bands and propagating the noise. The plurality of sub-bands are for each channel within a multi-channel system. Propagating the noise occurs in real-time. Alternatively, propagating the noise occurs offline. The method is applied in an application selected from the group consisting of digital image processing, sound processing, seismic wave data analysis and medical imaging. Preferably, each of the sub-bands are of equal width. Preferably, the plurality of sub-bands is between 2 and 4, inclusive. The noise could be of any type: white noise, colored noise, Gaussian and non-Gaussian noise.

In another aspect, a method of predicting noise after a spatial operation comprises decomposing the noise into a plurality of sub-bands and predicting sub-band noise, wherein the sub-band noise is a product of the sub-band noise before the spatial operation, sub-band energy of a spatial operation and the number of the plurality of sub-bands. The method further comprises assuming the noise is band-wise white. The noise is predicted in real-time. Preferably, each of the sub-bands are of equal width. Preferably, the plurality of sub-bands is between 2 and 4, inclusive. The noise could be of any type: white noise, colored noise, Gaussian and non-Gaussian noise.

In another aspect, a method of obtaining multi-channel/multi-band covariance matrices from a multi-channel system comprises splitting noise into a plurality of sub-bands per channel with a filter and generating an N×N matrix of sub-matrices wherein each of the sub-matrices is M×M. N is the number of sub-bands and M is the number of channels. The filter is selected from the group consisting of ideal and near-ideal band pass filters. Preferably, each of the sub-bands are of equal width. Preferably, the plurality of sub-bands is between 2 and 4, inclusive. The noise could be of any type: white noise, colored noise, Gaussian and non-Gaussian noise.

In yet another aspect, a system for propagating noise in a plurality of sub-bands comprises a splitting component for splitting the noise into the plurality of sub-bands and one or more processing components for receiving and propagating the noise in the plurality of sub-bands. The splitting component is a filter. The filter is selected from the group consisting of ideal and near-ideal band pass filters. Alternatively, the splitting component is a look-up table. The plurality of sub-bands are each per a channel. The noise could be of any type: white noise, colored noise, Gaussian and non-Gaussian noise. At least one of Human Visual System (HVS) models and Human Auditory System (HAS) models are able to be incorporated in the system.

In another aspect, a signal processing system comprises a receiver for receiving a signal containing noise, a filtering component for splitting the noise into a plurality of sub-bands and a processing component for determining a threshold for each of the sub-bands in the plurality of sub-bands and filtering the noise below the threshold. The filtering component is selected from the group consisting of ideal and near-ideal band pass filters. The plurality of sub-bands are each per a channel. The noise could be of any type: white noise, colored noise, Gaussian and non-Gaussian noise. At least one of Human Visual System (HVS) models and Human Auditory System (HAS) models are able to be incorporated in the system.

DETAILED DESCRIPTION OF THE PREFERRED EMBODIMENT

Figure 1:
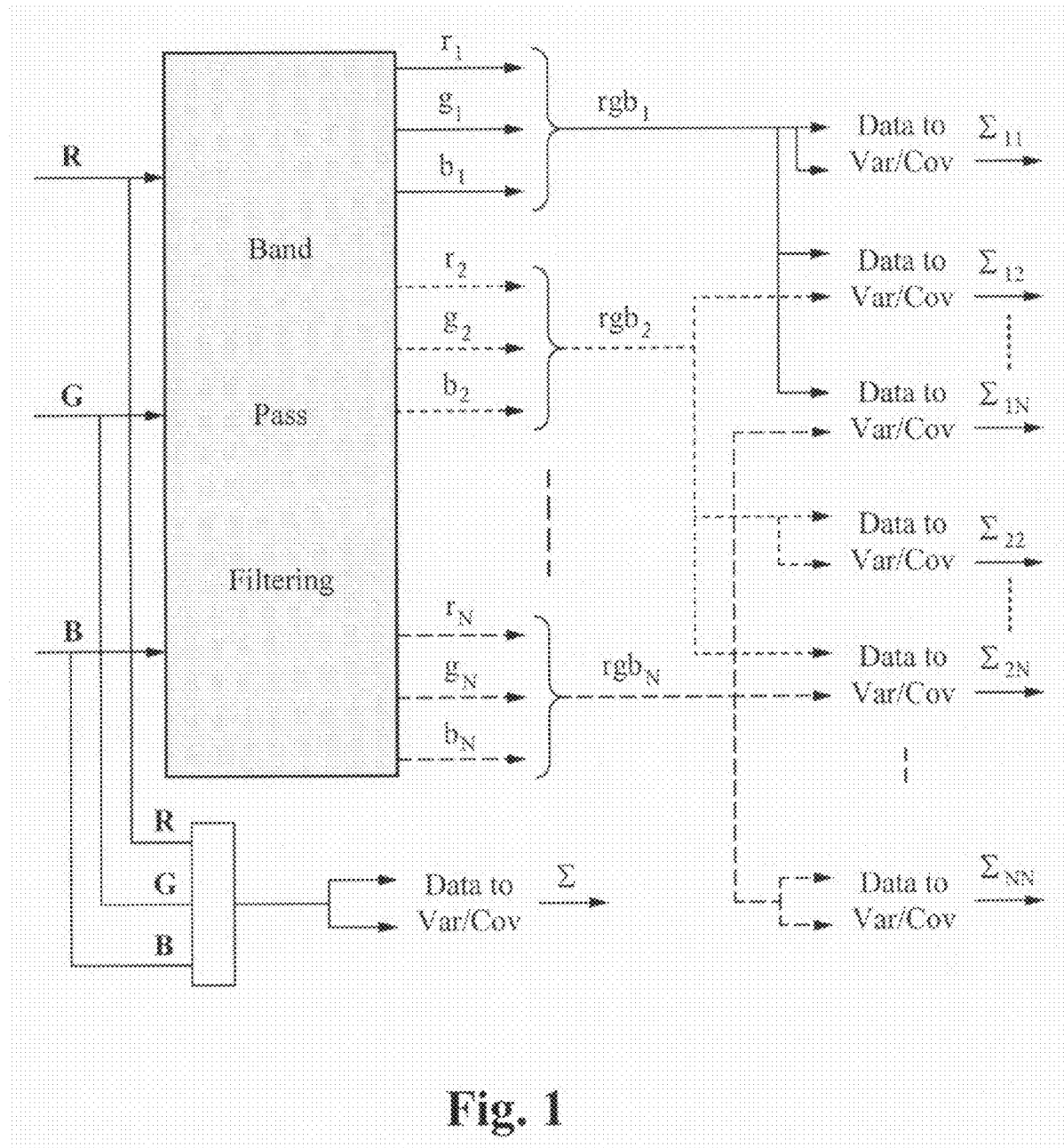
FIG. 1 illustrates a block diagram of a process of obtaining multi-channel/multi-band covariance matrices from a multi-channel system.

A noise analysis framework for propagating both colored and white noise through all types of operations (linear, non-linear and spatial) is described herein. Input noise is decomposed into sub-bands and sub-band noise is propagated through a signal processing pipeline. Using this, it is possible to exactly predict sub-band noise after a linear or a non-linear (linearized via a Jacobian) transformation. For predicting noise after a spatial operation, the energy of the spatial operation is a-priori decomposed into sub-bands. By considering the noise to be band-wise white and by using ideal (or near-ideal) bandpass filtering, the sub-band noise after a spatial operation or transformation is simply the product of the sub-band noise energy before this operation, the sub-band energy of the spatial transformation and the number of sub-bands.

By decomposing noise in each channel into sub-bands and by assuming sub-band noise to be white within each band, noise is able to be accurately propagated across all signal processing operations (linear, non-linear and spatial).

By propagating sub-band noise, Human Visual System (HVS) models and Human Auditory System (HAS) models are able to be incorporated in the design of imaging and audio systems.

The approach described herein is very efficient computationally and does not require many calculations. Therefore, it is able to be used in multi-parameter optimization and real-time applications. The approach described herein is also able to be used in offline applications.

Further below are sections describing different components of the noise analysis system and methodology. The Band-Pass Filtering section describes the process of splitting both input noise and signal processing steps into sub-bands. The process of propagating multi-channel/multi-band noise across a linear operation is described in the Noise Propagation Across a Linear Transformation section. In the Split Filter Concept section, the split filter concept is presented, and it is shown that by using ideal (or near-ideal) band pass filtering, sub-band noise after a spatial operation is able to be predicted in a very fast way. In the Noise Propagation Across a Spatial Transformation section, the split-filter concept with assumptions that the noise is bandwise white allows efficient prediction of noise after spatial operations such as demosaicing, FIR filtering and edge enhancement. Further sections include the computational complexity and possible applications of the noise analysis system and method described herein.

Band-Pass Filtering

Before performing noise propagation calculations, both input noise and signal processing steps need to be split into sub-bands. The multi-channel input noise covariance matrix $\Sigma$ has to be split into multi-band/multi-channel, covariance matrices. For instance, for an RGB (3-channel) image processing system, the full band, multi-channel, noise covariance matrix is able to be written as:

$$\Sigma = \begin{bmatrix} \sigma_{RR} & \sigma_{RG} & \sigma_{RB} \\ \sigma_{GR} & \sigma_{GG} & \sigma_{GB} \\ \sigma_{BR} & \sigma_{BG} & \sigma_{BB} \end{bmatrix} \quad (1)$$

For ease of notation, the multi-band/multi-channel covariance matrices, obtained after splitting noise into sub-bands into a symmetric block covariance matrix are written:

$$\Sigma_{band} = \begin{bmatrix} \Sigma_{11} & \Sigma_{12} & \cdots & \Sigma_{1N} \\ \Sigma_{21} & \Sigma_{22} & \cdots & \Sigma_{2N} \\ \cdots & \cdots & \cdots & \cdots \\ \Sigma_{N1} & \Sigma_{N2} & \cdots & \Sigma_{NN} \end{bmatrix} \quad (2)$$

where $\Sigma_{ij} = \Sigma_{ji}$. This sub-band covariance matrix ($\Sigma_{band}$) includes N×N sub-matrices. Each sub-matrix is M×M where N is the number of sub-bands and M is the number of channels. The diagonal sub-matrices contain intra-band covariances (within a particular frequency band), while the off diagonal sub-matrices contain the interband (between frequency bands) covariances. The process of converting multi-channel noise with covariance $\Sigma$ to a multi-channel/multi-band, covariance matrix $\Sigma_{band}$ for a 3-channel system is illustrated in FIG. 1.

The splitting filter is able to be of any type. However, if ideal (or near ideal) band-pass filters (BPF) are used, covariances between sub-bands become zero. Therefore, $$\Sigma_{band} = \begin{bmatrix} \Sigma_{11} & & & \\ & \Sigma_{11} & & \\ & & \ddots & \\ & & & \Sigma_{NN} \end{bmatrix} \quad (3)$$

becomes block diagonal, significantly simplifying the noise propagation calculation. Furthermore, for ideal (or near-ideal) BPF, it is possible to propagate noise across a spatial operation, such as Finite Impulse Response (FIR) filtering, demosaicing and edge enhancement.

Multi-channel/multi-band noise propagation for linear and spatial operations is described next. Non-linear operations are able to be linearized via a Jacobian matrix, therefore its analysis is similar to that of a linear equation.

Noise Propagation Across a Linear Transformation

Figure 2:
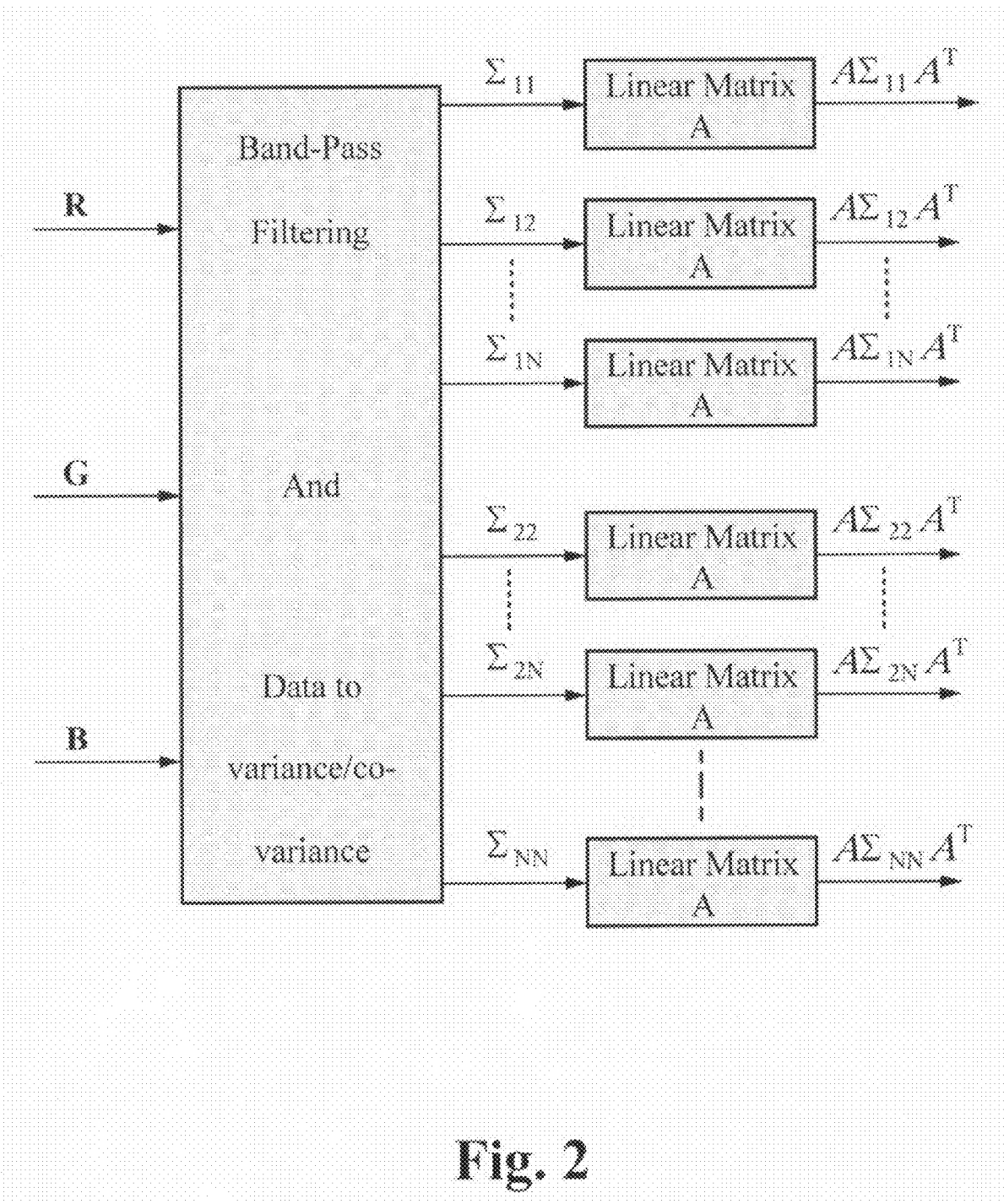
FIG. 2 illustrates a block diagram of a linear transform applied to a multi-channel/multi-band scheme.

In this subsection, the influence of a linear operation on a multi-band/multi-channel system is analyzed. As shown in FIG. 2, a linear matrix is applied to each of the covariance matrices. The block covariance matrix after a linear transformation A is able to be written as $$\Sigma_{band}^{A} = \begin{bmatrix} A\Sigma_{11}A^T & A\Sigma_{12}A^T & \cdots & A\Sigma_{1N}A^T \\ A\Sigma_{21}A^T & A\Sigma_{22}A^T & \cdots & A\Sigma_{2N}A^T \\ \cdots & \cdots & \ddots & \cdots \\ A\Sigma_{N1}A^T & A\Sigma_{N2}A^T & \cdots & A\Sigma_{NN}A^T \end{bmatrix},$$

In compact form, this is rewritten to be:

$$\Sigma_{band}^{A} = A_{band} \Sigma_{band} A_{band}^T \quad (4)$$

$$\text{where, } A_{band} = \begin{bmatrix} A & & & \\ & A & & \\ & & \ddots & \\ & & & A \end{bmatrix} \quad (5)$$

Since transformation A has no frequency dependence, the sub-matrices in $A_{band}$ do not vary from sub-band to sub-band. The matrix $\Sigma^A$ is able to be reconstructed from $\Sigma_{band}^A$, where $\Sigma^A = A\Sigma A^T$ is the full-band covariance matrix obtained by transforming the full-band input covariance $\Sigma$ by a linear transform A.

Split Filter Concept

Thus far, it has been shown that the multi-channel/multi-band noise propagation scheme is able to exactly predict noise after a linear operation. As mentioned earlier, non-linear operations (such as gamma in an image processing pipeline) are linearized via a Jacobian. Hence, its analysis is similar to that of a linear operation. A theoretical expression for computing the output sub-band noise energy after a spatial transformation in terms of the input sub-band noise energy and the filter sub-band energy is derived herein.

Figure 3:
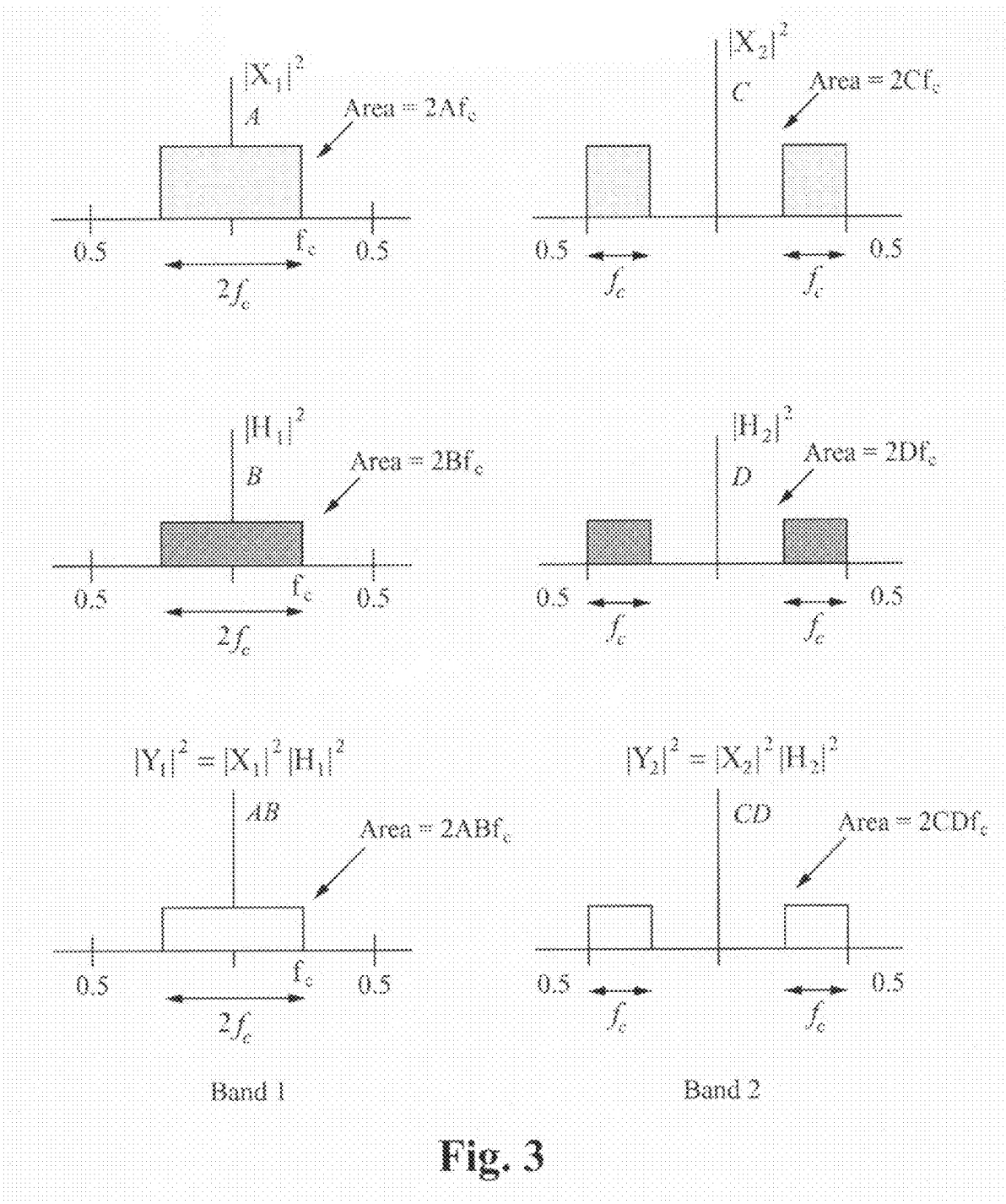
FIG. 3 illustrates a graphical representation of the noise and filter split into two bands.

The noise and filter are split into two bands as shown in FIG. 3. The input noise autocorrelation function of the first sub-band is able to be written as:

$$\phi_{x_1 x_1}(n) = \begin{cases} 2Af_c, & n=0 \\ A\dfrac{\sin 2\pi f_c n}{\pi n}, & \text{otherwise} \end{cases},$$

The autocorrelation function at zero lag represents the energy which is also the area under the frequency band. This energy is the sub-band variance. Therefore, the noise variance in the first sub-band is $\sigma_{x_i x_i} = 2Af_c$, the filter sub-band energy is $\sigma_{h_i h_i} = 2Bf_c$, and the output sub-band energy is $\sigma_{y_i p_i} = 2ABf_c$. If the full-band is split into N sub-bands, the width of each band is $$2f_c = \frac{1}{N}. \text{ Hence, } \sigma_{x_1 x_1} = \frac{A}{N},$$

$$\sigma_{h_1 h_1} = \frac{B}{N} \text{ and } \sigma_{y_1 y_1} = \frac{AB}{N} = \sigma_{x_1 x_1} \sigma_{h_1 h_1} N.$$

As long as the band-pass filtering is ideal (or near ideal, e.g. a very long tap filter), the output sub-band noise energy is able to simply be estimated as the product of the input sub-band noise energy, spatial transform sub-band energy and the number of sub-bands. Without loss of generality, it can be written:

$$\hat{\sigma}_{y_i p_i} = \sigma_{x_i x_i} \sigma_{h_i h_i} N, \quad (6)$$

where, $i=1, \ldots, N$. The estimated full-band noise variance is simply the sum of the sub-band noise variances:

$$\hat{\sigma}_{yy} = \sum_{i=1}^{N} \hat{\sigma}_{y_i y_i}. \quad (7)$$

Using this result, it is possible to predict noise after a spatial transformation in a very fast and accurate manner.

Figure 4A:
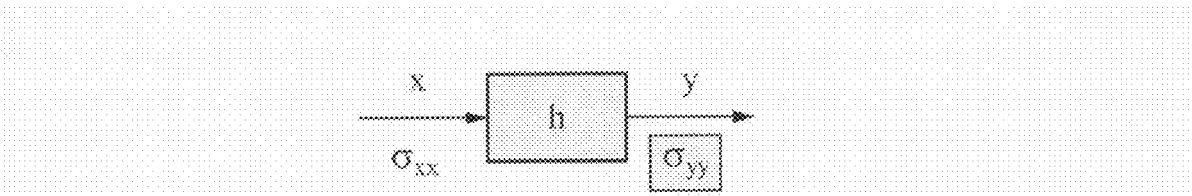
FIGS. 4A-B illustrate block diagrams of noise propagation methodologies.
Figure 4B:
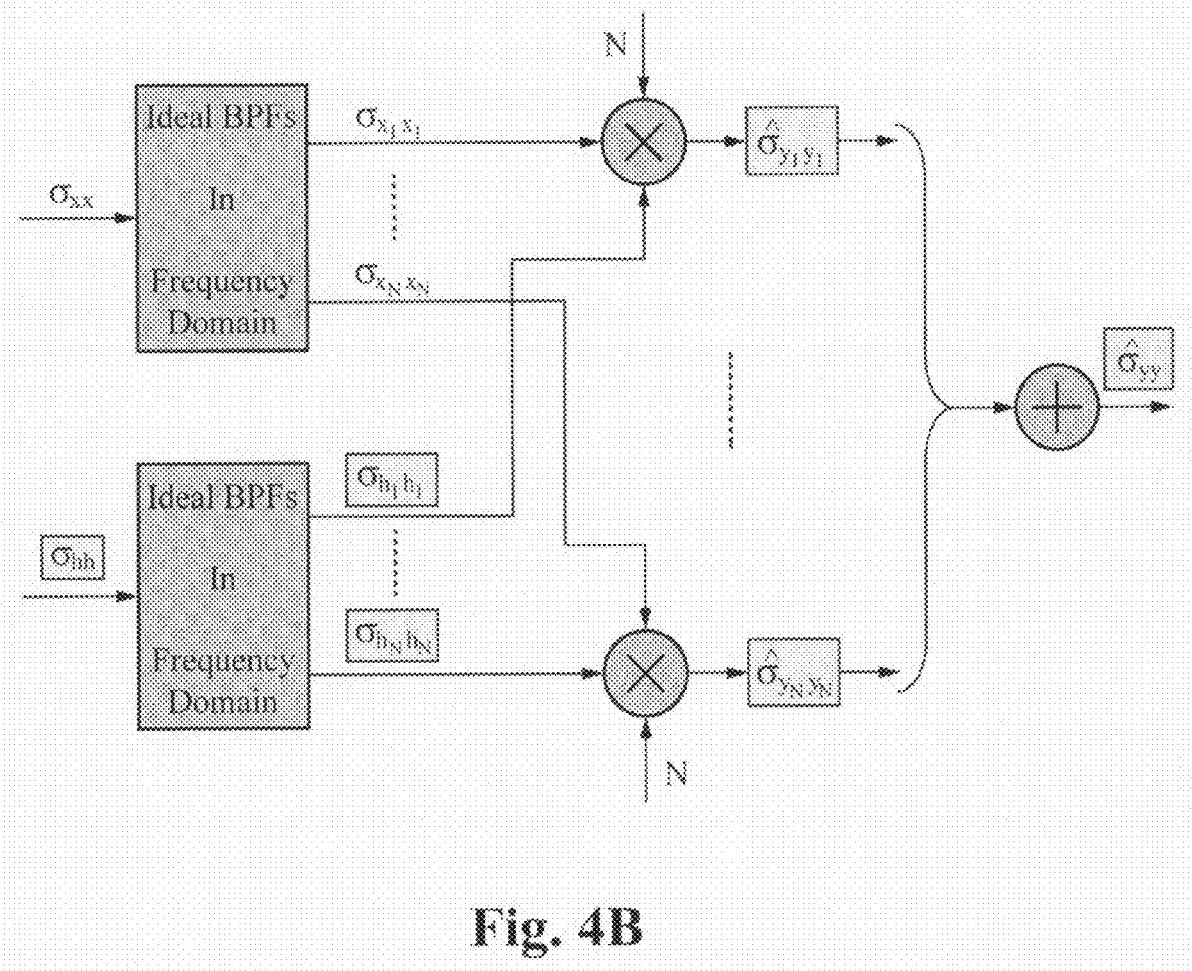

To evaluate the efficacy of the scheme, both exact and band-wise white noise propagation schemes are considered to propagate colored noise across a FIR low-pass filter (single-channel spatial transformation). The exact (convolution) and band-wise white propagation techniques are illustrated in FIGS. 4A-B, where FIG. 4A is the exact scheme and FIG. 4B is the band-wise white method. In FIG. 4A, $\sigma_{xx}$ is the variance of the input sequence x, h is the filter and $\sigma_{yy}$ is the variance of the filtered sequence y. In FIG. 4B, $\sigma_{x_i x_i}$ and $\sigma_{h_i h_i}$ are respectively the input and filter sub-band variances. The estimated output sub-band and full-band variances are respectively $\hat{\sigma}_{y_i p_i}$ and $\hat{\sigma}_{yy}$, where $i=1, \ldots, N$ and N is the number of sub-bands. Colored noise is generated by pre-filtering white noise with a low-pass filter having a normalized cutoff frequency of 0.25. Using ideal (or near-ideal) band-pass filtering, both input noise variance $\sigma_{xx}$ and the FIR filter variance $\sigma_{hh}$ are decomposed into sub-band variances $\sigma_{x_i x_i}$ and $\sigma_{h_i h_i}$, where $i=1, \ldots, N$. Then, by using equations (6) and (7), the sub-band noise variance $\hat{\sigma}_{y_i p_i}$ and the full-band noise variance $\hat{\sigma}_{yy}$ are estimated after filtering. To achieve the exact noise variance after filtering $\sigma_{yy}$, an input noise sequence x of variance $\sigma_{xx}$ is convolved with the filter h. This gives an output sequence y, from which $\sigma_{yy}$ is obtained. Finally, a normalized error is used as a measure of noise propagation accuracy $$\varepsilon_{\sigma_{yy}} = \frac{\hat{\sigma}_{yy} - \sigma_{yy}}{\sigma_{yy}}. \quad (8)$$

Figure 5:
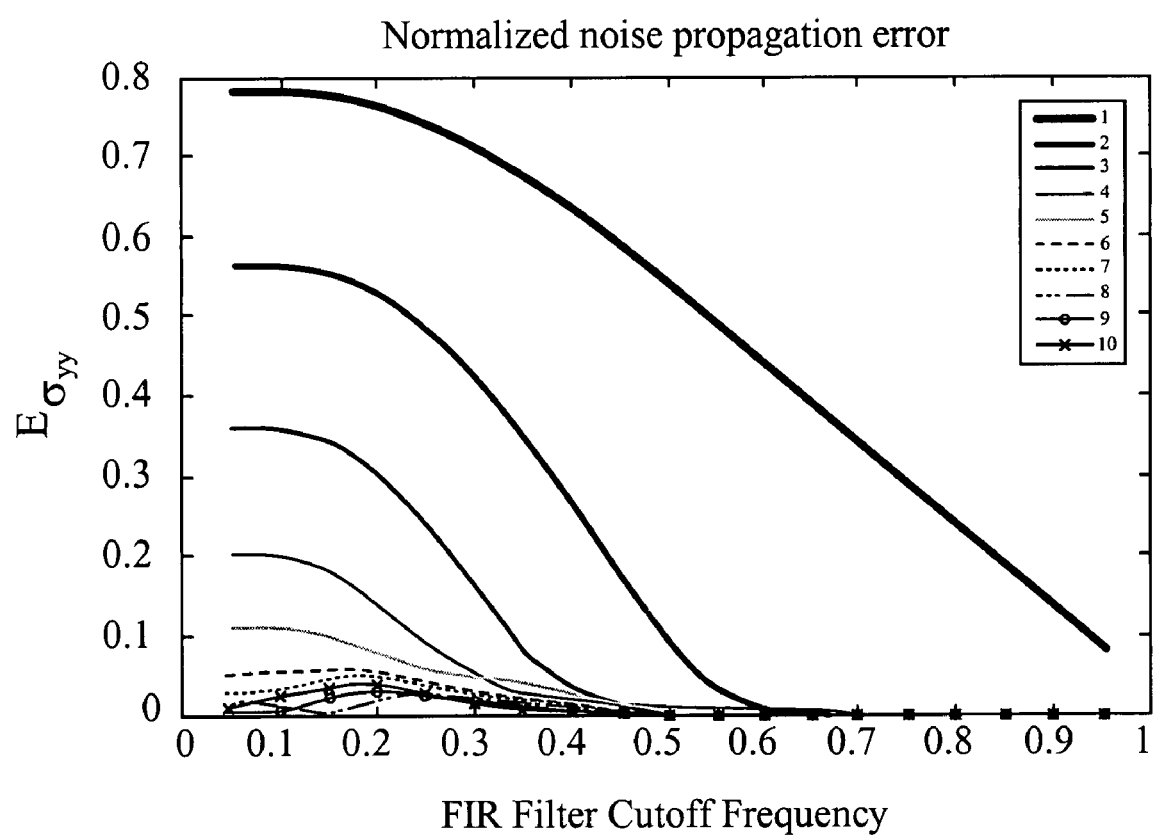
FIG. 5 illustrates a graphical representation of varying the number of sub-bands and FIR low-pass filter cutoff frequency on colored noise propagation accuracy.

To show the noise propagation accuracy of the method, the number of sub-bands is varied from 1 (full-band) to 10 and the FIR filter-cutoff frequency is varied from a normalized frequency of 0.05 to 0.95 and the effect on normalized error $\varepsilon_{\sigma_{yy}}$ is evaluated. It can be seen from FIG. 5 that increasing the number of sub-bands improves colored noise propagation accuracy. This is what is expected from the bandwise-white assumption. Depending on the desired accuracy, the number of sub-bands preferably ranges from 4 to 7, generally, or 2 to 4 for image denoising.

Noise Propagation Across a Spatial Transformation

By assuming the noise to be bandwise white and by applying the split-filter concept described above, noise after a spatial operation is able to be predicted. Similar to equation (5), a block diagonal spatial transformation matrix is defined:

$$S_{band} = \begin{bmatrix} S_1 & & & \\ & S_2 & & \\ & & \ddots & \\ & & & S_N \end{bmatrix}, \quad (9)$$

where $S_i$ is the M×M transformation matrix for each frequency band, i=1, ..., N, M is the number of channels, and N is the number of sub-bands. Once there is a block diagonal spatial transformation matrix $S_{band}$, the sub-band noise covariance after a spatial operation $\Sigma_{band}^S$ is able to be expressed in terms of the sub-band noise covariance before filtering as $$\Sigma_{band}^S = S_{band} \Sigma_{band} S_{band}^T. \quad (10)$$

If the spatial transformation has no inter-channel correlations, e.g. FIR filtering, the matrix $S_i$ would be a diagonal matrix. On the other hand, if the operation has spatial correlation between channels, e.g. demosaicing, the matrix $S_i$ would have non-zero off-diagonal terms. Therefore, the key to predicting noise after any spatial operation is to devise the matrix $S_i$ that accurately reflects the frequency domain behavior of the transformation.

In the following, the sub-band transformation matrix $S_i$ is derived for filtering, demosaicing, and edge enhancement (or sharpening). These examples are just for illustration purposes. In a similar fashion, the matrix $S_i$ is able to be formed for any spatial operation.

FIR Filtering

Since this operation does not have any spatial correlations between channels, the matrix $S_i$ is an M by M diagonal matrix $$S_i = \begin{bmatrix} \sqrt{\sigma_{h_i h_i}^1 N} & & & \\ & \sqrt{\sigma_{h_i h_i}^2 N} & & \\ & & \ddots & \\ & & & \sqrt{\sigma_{h_i h_i}^M N} \end{bmatrix}, \quad (11)$$

where $\sigma_{h_i h_i}^j$ is the variance of the $i^{th}$ sub-band obtained from splitting the $j^{th}$ channel FIR filter into sub-bands. If the same FIR filter is used for all channels, then $\sigma_{h_i h_i}^1 = \sigma_{h_i h_i}^2 = \ldots = \sigma_{h_i h_i}^M = \sigma_{h_i h_i}^1$ and equation (11) is able to be further simplified to $$S_i = \begin{bmatrix} \sqrt{\sigma_{h_i h_i} N} & & & \\ & \sqrt{\sigma_{h_i h_i} N} & & \\ & & \ddots & \\ & & & \sqrt{\sigma_{h_i h_i} N} \end{bmatrix}.$$

Demosaicing

Figure 6:
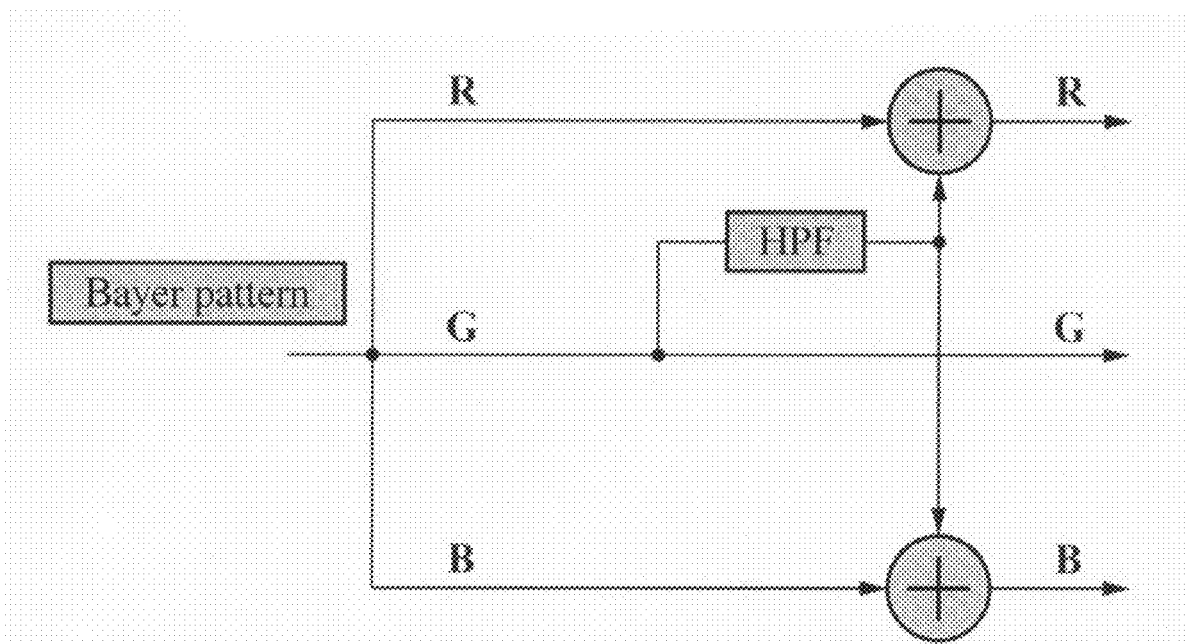
FIG. 6 illustrates a block diagram of the frequency-domain effect of demosaicing.

The Color Filter Array (CFA) in a single sensor camera is typically in the form of a Bayer pattern. For an RGB camera, the imaging array includes 25% red, 50% green and 25% blue pixels. Therefore, in the sub-sampled multi-channel data obtained from the CFA, the green channel has both low and high frequency components, while red and blue channels have only low frequency information. To estimate remaining pixels, researchers have proposed a number of demosaicing algorithms. Although these methods have significant differences, an intrinsic property of all these approaches is that the high frequency information from the green channel is copied to the red and blue channels. This frequency domain effect of demosaicing is illustrated in FIG. 6.

Using these observations, equation (10) is re-written as $$\Sigma_{band} = \begin{bmatrix} \sigma_{R_L} & & & & \\ & \sigma_{G_L} & & 0 & \\ & & \sigma_{B_L} & & \\ & & & 0 & \\ & 0 & & & \sigma_{G_H} \\ & & & & & 0 \end{bmatrix}, \quad (12)$$

$$S_i = \begin{cases} \begin{bmatrix} 1 & 0 & 0 \\ 0 & 1 & 0 \\ 0 & 0 & 1 \end{bmatrix}, & i = 1 \\ \begin{bmatrix} 1 & 1 & 0 \\ 0 & 1 & 0 \\ 0 & 1 & 1 \end{bmatrix}, & i = 2 \end{cases},$$

$$\Sigma_{band}^S = \begin{bmatrix} \sigma_{R_L} & & & & & \\ & \sigma_{G_L} & & 0 & & \\ & & \sigma_{B_L} & & & \\ & & & \sigma_{G_H} & \sigma_{G_H} & \sigma_{G_H} \\ & 0 & & \sigma_{G_H} & \sigma_{G_H} & \sigma_{G_H} \\ & & & \sigma_{G_H} & \sigma_{G_H} & \sigma_{G_H} \end{bmatrix}.$$

From above, the expression for the matrix $S_i$ which captures the essence of demosaicing for an RGB camera is $$S_i = \begin{bmatrix} 1 & \sqrt{\sigma_{h_{LPF}^i h_{LPF}^i} N} & 0 \\ 0 & 1 & 0 \\ 0 & \sqrt{\sigma_{h_{LPF}^i h_{LPF}^i} N} & 1 \end{bmatrix}. \quad (13)$$

Depending on the demosaicing algorithm, the characteristics of the high-pass filter are able to be quite different or additional inter-channel correlations may need to be considered.

Edge Enhancement or Sharpening

Figure 7:
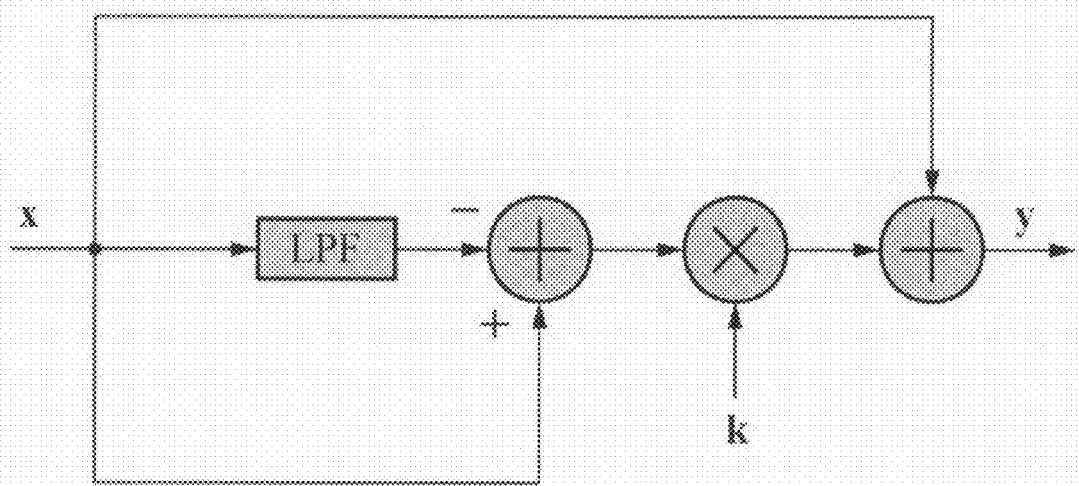
FIG. 7 illustrates a block diagram of the frequency-domain effect of sharpening or edge enhancement.

A sharpening operation enhances edges and other high frequency components in an image. For example, a procedure which subtracts an unsharp or smoothed version of an image from the original image x to enhance high-frequency content is illustrated in FIG. 7. The free parameter k controls the degree of sharpening. Assuming the noise to be band-wise white, the noise in the $i^{th}$ sub-band of the sharpened image y is written as $$\sigma_{y^i y^i} = k(\sigma_{x^i x^i} - \sigma_{h_{LPF}^i h_{LPF}^i} \sigma_{x^i x^i} N) + \sigma_{x^i x^i}, \quad (14)$$

$$= \sigma_{x^i x^i}[1 + k(1 - \sigma_{h_{LPF}^i h_{LPF}^i} N)],$$

$$= \sigma_{x^i x^i} \sqrt{1 + k(1 - \sigma_{h_{LPF}^i h_{LPF}^i} N)} \sqrt{1 + k(1 - \sigma_{h_{LPF}^i h_{LPF}^i} N)}.$$

Therefore, the matrix $S_i$ for predicting noise after a sharpening operation (if applied to all channels) is $$S_i = \begin{bmatrix} \sqrt{1+k_1\left(1-\sigma^1_{h_{LPH}h_{LPH}^l}N\right)} & & & \\ & \sqrt{1+k_2\left(1-\sigma^2_{h_{LPH}h_{LPH}^l}N\right)} & & \\ & & \ddots & \\ & & & \sqrt{1+k_M\left(1-\sigma^M_{h_{LPH}h_{LPH}^l}N\right)} \end{bmatrix}. \quad (15)$$

The sharpening example in FIG. 7 employs a combination of a low-pass filter and a subtractor to realize high-pass filtering. This is only one embodiment of edge enhancement/sharpening. Other manifestations of this operation, which are able to also be easily handled by the present technique are able to utilize a band-pass filter to extract frequencies that need to be boosted.

Computational Complexity

Noise propagation can be achieved in one of three ways: a) simple multi-variate error propagation, also known as the Burns and Berns (B&B) method. This method can be used for analyzing the influence of linear and non-linear operations on noise. However, the B&B method ignores spatial transformations, therefore noise analysis is prone to error in a system that contains spatial operations; b) Image simulation, in which a set of color patches containing noise are propagated through a signal processing pipeline. This method is exact; and c) via the noise analysis framework described herein, which is referred to as the extended-B&B method. The computational complexity of extended-B&B is compared to image simulation for a typical RGB (M=3) digital camera image processing pipeline (shown in FIG. 8).

Image simulation refers to the process of propagating a color patch, whose channels (RGB in this case) contain noise of a given variance, through the imaging pipeline. In contrast, as explained earlier, the extended-B&B method splits the noise variance in each channel into sub-bands and propagates multi-channel/multi-band variances through the imaging pipeline. Using Equation (7), the full-band variances are able to be estimated, from the sub-band variances, at any point ($YC_bC_r$, $L*a*b*$, and so on) in the imaging pipeline.

Analytical expressions are computed for the number of floating point operations (flops) for image simulation and extended-B&B schemes. The computational burden of the extended-B&B method is only a very small fraction of the computational cost of image simulation.

Image Simulation

The gain and white balancing blocks represent 3×3 diagonal matrices. They require 1 multiplication per pixel to propagate the image. A simple 4-neighbor bi-linear demosaicing operation that does not have any correlation between channels is assumed. This requires 3 additions and 1 multiplication per pixel. The matrix and the RGB2YCbCr matrices being dense, need 3 multiplications and 2 additions per pixel. The gamma operation is performed via a look-up table requiring no floating point computations. Filtering with a FIR filter of length P requires P multiplications and P−1 additions per pixel. Similarly, the sharpening operation, shown in FIG. 7 requires P+1 multiplications and P+3 additions per pixel.

To compute each entry of the noise covariance matrix of the propagated image, 1 addition per pixel is needed to get the mean and 2 additions and 1 multiplication per pixel for the variance. Since this matrix is symmetric, there are only $$\frac{M(M+1)}{2}$$

unique entries. Therefore, the number of per-pixel flops for computing the noise covariance matrix is 2M(M+1). To scale the mean and variance by the number of pixels in the image, 2 (one for each mean and variance) multiplications are needed for each entry in the noise variance-covariance matrix. Since the number of these computations is much smaller than the per-pixel flops, they are able to be ignored.

Combining the additions and multiplications of all operations for an M-channel camera system yields 2M(M+1)+16M+2(2P−1)+2P+4=2M²+18M+6P+2 flops per pixel (there are two FIR filters: one for each Cb and Cr channels). If a FIR filter of length P=25 and M=3, image simulation requires 224 flops per pixel. Therefore, to propagate a K×L image, through the simple image processing pipeline shown in FIG. 8, will require 224 K L flops. K, L should be chosen such that the image being propagated contains a statistically significant number of pixels. If K=L=100, then the computational overhead of image simulation is 2.24 million flops. This is not feasible for any practical system.

Extended-B&B Method

Variances of all filters are decomposed (de-mosaicing high-pass filter in FIG. 6, sharpening low-pass filter in FIG. 7, and FIR low-pass filter in FIG. 8) in the imaging pipeline a-priori into N sub-bands. The N sub-band noise variances at sensor output are also known. To propagate noise across a diagonal M×M matrix, 2M multiplications are needed per sub-band. Similarly, for a dense M×M matrix, 3 multiplications and 2 additions per sub-band are needed for each matrix element. This implies that 5M² flops per sub-band are needed to propagate noise across a dense matrix. For predicting noise after demosaicing, the procedure outlined in the Demosaicing section above is employed. Owing to the sparse nature of $S_i$ in Equation (13), it is seen that computing noise after demosaicing involves 8M flops (4M multiplications and 4M additions) per sub-band. To simplify noise propagation across Cb/Cr filtering and Y-channel sharpening, the combined sub-band transformation matrix is formed $$S_i = \begin{bmatrix} \sqrt{1 + k_1\left(1 - \sigma_{h^i_{sharp} h^i_{sharp}} N\right)} & & \\ & \sqrt{\sigma_{h^i_{C_b} h^i_{C_b}} N} & \\ & & \sqrt{\sigma_{h^i_{C_r} h^i_{C_r}} N} \end{bmatrix}, \quad (16)$$

where, $\sigma_{h^i_{sharp} h^i_{sharp}}$, $\sigma_{h^i_{C_b} h^i_{C_b}}$ and $\sigma_{h^i_{C_r} h^i_{C_r}}$ are the respective sub-band filter variances for the low-pass filter in sharpening, and $C_b$, $C_r$ filtering and i=1, . . . , N. Noise propagation across this combined transformation requires 6M flops per sub-band.

Therefore, the overhead of propagating noise via the extended-B&B scheme per sub-band is 4M flops for the two diagonal matrices (gain and white balancing), 8M flops for demosaicing, $10M^2$ flops for the two dense matrices (Matrix and RGB to YCbCr matrix), 6M flops for the gamma operation which is linearized via a Jacobian, and 6M flops for the combined sharpening and Cb/Cr filtering transformation. For N sub-bands this adds up to $(10M^2+24M)N$ flops. For an RGB camera (M=3), this becomes 162N flops. For two sub-bands, 324 flops are needed, while four sub-bands require 648 flops. Therefore, the computational cost of extended-B&B method is less than 0.03% of image simulation and is certainly plausible for real-time applications.

There are applications where a-priori knowledge of sub-band variances is obtained at the start of the signal processing pipeline. In such situations, the computational cost of splitting noise variance into sub-bands must be included. Decomposing noise variance of each channel into N sub-bands requires N+1 Fast Fourier Transforms (FFT's)—one FFT to take the noise sequence to frequency domain and N inverse-FFT's to convert the split bands back to spatial domain. If the length of the forward FFT is Q, then the length of the inverse-FFT's are Q/N (split into N bands). The computational cost for M channels is $$M\left(4Q\log_2 Q - 6Q + 8 + N\left(4\frac{Q}{4}\log_2\frac{Q}{4} - 6\frac{Q}{4} + 8\right)\right)$$

flops. For a 64 point FFT, the cost of splitting noise into bands becomes (168N+1160)M. The cumulative flop count for splitting noise variances into sub-bands, the computational cost is 4812 flops, while for four sub-bands, the computational overhead is 6144 flops. Clearly, the main complexity is in the procedure for splitting noise into sub-bands. A more efficient splitting process, such as using a look-up table, will make the scheme even faster. Nevertheless, even with the computational cost of band splitting, extended-B&B is less than 0.2% of the computational complexity of image simulation.

Applications

Digital Imaging System Design

Noise analysis, prediction and suppression is a significant problem in digital imaging system design. The captured image is corrupted by noise in the image sensor as well as by noise generated by system electronics. The noise has both signal independent and signal dependent components. Before the image is written to an output device, it undergoes a series of image processing steps such as color transformations, white balancing, gamma correction and filtering. These operations alter the characteristics of noise. Multivariate error-propagation, also known as the Burns and Berns (B&B) scheme, has been used for analyzing the influence of linear and non-linear transformations on noise as it propagates through a digital imaging pipeline. As mentioned earlier, these schemes ignore spatial transformations, therefore their noise analysis is not precise. In contrast, the present scheme is able to deal with all transformations and is very accurate.

Figure 10:
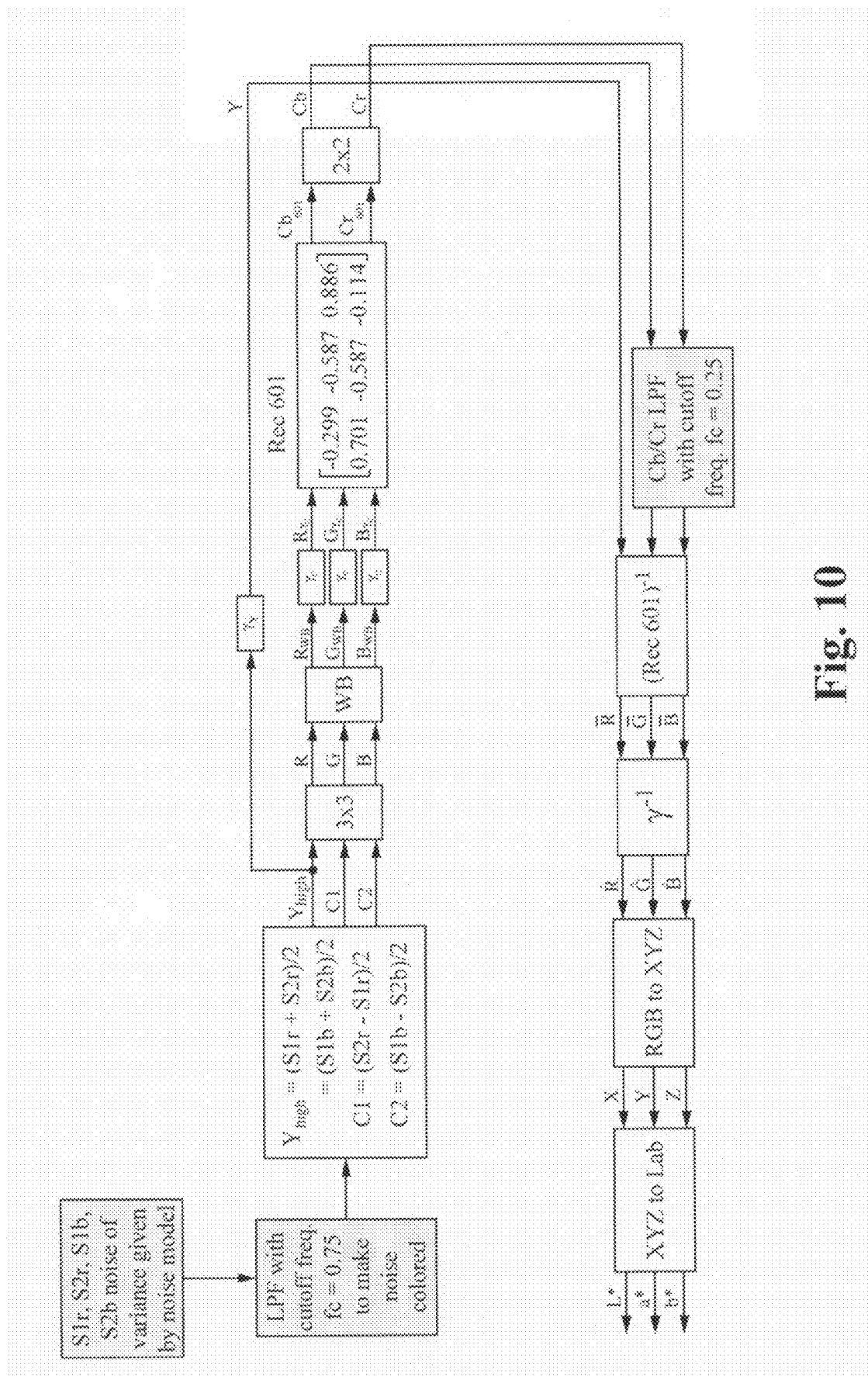
FIG. 10 illustrates an exemplary camera image pipeline for analysis in a perceptually uniform color space (L*a*b* color space).

To compare the strength of the present scheme with the B&B method for digital imaging system designs, colored noise is generated and passed through the linear, non-linear and spatial (FIR low-pass filter) operations representing a typical digital camera imaging pipeline. To obtain a meaningful comparison, the output is transformed to the perceptually uniform L*a*b* color space. A block diagram of the setup is given in FIG. 10. The reference for evaluating both methods (extended-B&B and B&B) is the noise obtained by propagating an image through all of the operations in FIG. 10 ($\sigma_{LL}$, $\sigma_{aa}$ and $\sigma_{bb}$). As shown in the computational complexity section, propagating an image is computationally very expensive and is only done for evaluation purposes. In the B&B method, fullband noise variances are propagated and the $C_b/C_r$ FIR low-pass filter is ignored. While, for the extended-B&B technique, the noise is split into sub-bands and the sub-band noise variances are propagated to L*a*b* color space ($\hat{\sigma}_{L_iL_i}$, $\hat{\sigma}_{a_ia_i}$ and $\hat{\sigma}_{b_ib_i}$ where i=1, . . . , N). Adding the sub-band variances (as in equation (7)), the estimated fullband noise in L*a*b* ($\hat{\sigma}_{LL}$, $\hat{\sigma}_{aa}$ and $\hat{\sigma}_{bb}$).

Figure 8:
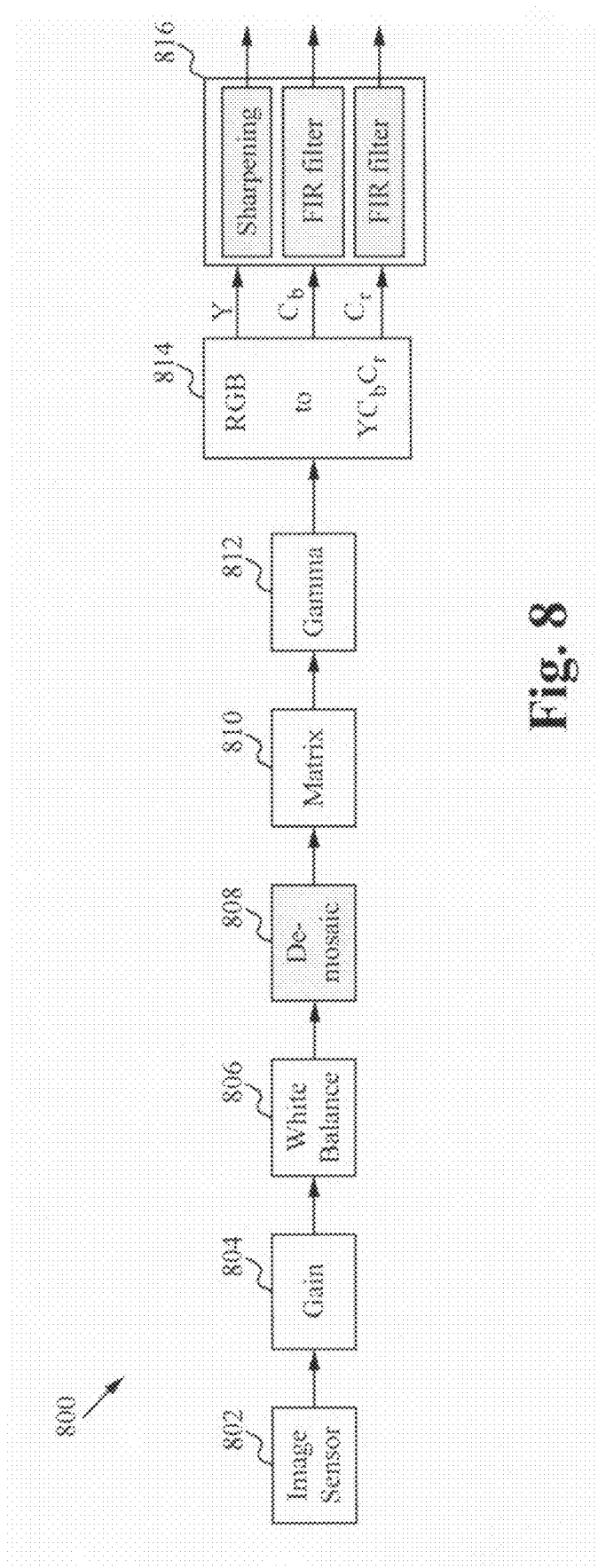
FIG. 8 illustrates an exemplary camera image pipeline.

FIG. 8 shows a block diagram of a camera pipeline 800. An image sensor 802 sends a Gaussian, white and uncorrelated noise but has signal level dependence. The noise also has missing pixels (mosaiced). A gain component 804 produces high gain at low-light and low gain at high-light. Signal-noise behavior changes accordingly. A white balance component 806 changes gains for R, G and B depending on illumination. Furthermore, channel dependence exists after the white balance component 806. After using a demosaicing component 808 to demosaic complete RGB planes, there is frequency dependent inter-channel correlation. Specifically, G-channel high frequency noise is copied to the B and R channels, maintaining higher inter-channel correlation than at low frequency. After a matrix component 810 the inter-channel correlation is more complicated. After a gamma component 812, strong level dependence is added, and the noise is not Gaussian anymore. An RGB to YCbCr matrix 814 adds additional frequency dependence due to color signal band limiting. A sharpening/filtering component 816 boosts Y signal high frequency and the C signal is band limited. Final camera output usually has channel wise (YCbCr), signal-level-wise and band-wise noise. By using the noise analysis and methodology, the resulting noise is able to be predicted quickly and accurately.

Utilizing FIG. 8, the normalized noise propagation error $\epsilon_{\sigma_{aa}}$ in the a* channel is calculated for both B&B and extended-B&B schemes. To analyze the influence of the number of sub-bands on noise propagation accuracy, the number of frequency bands is also varied in ext-B&B technique from one to four.

Figure 9:
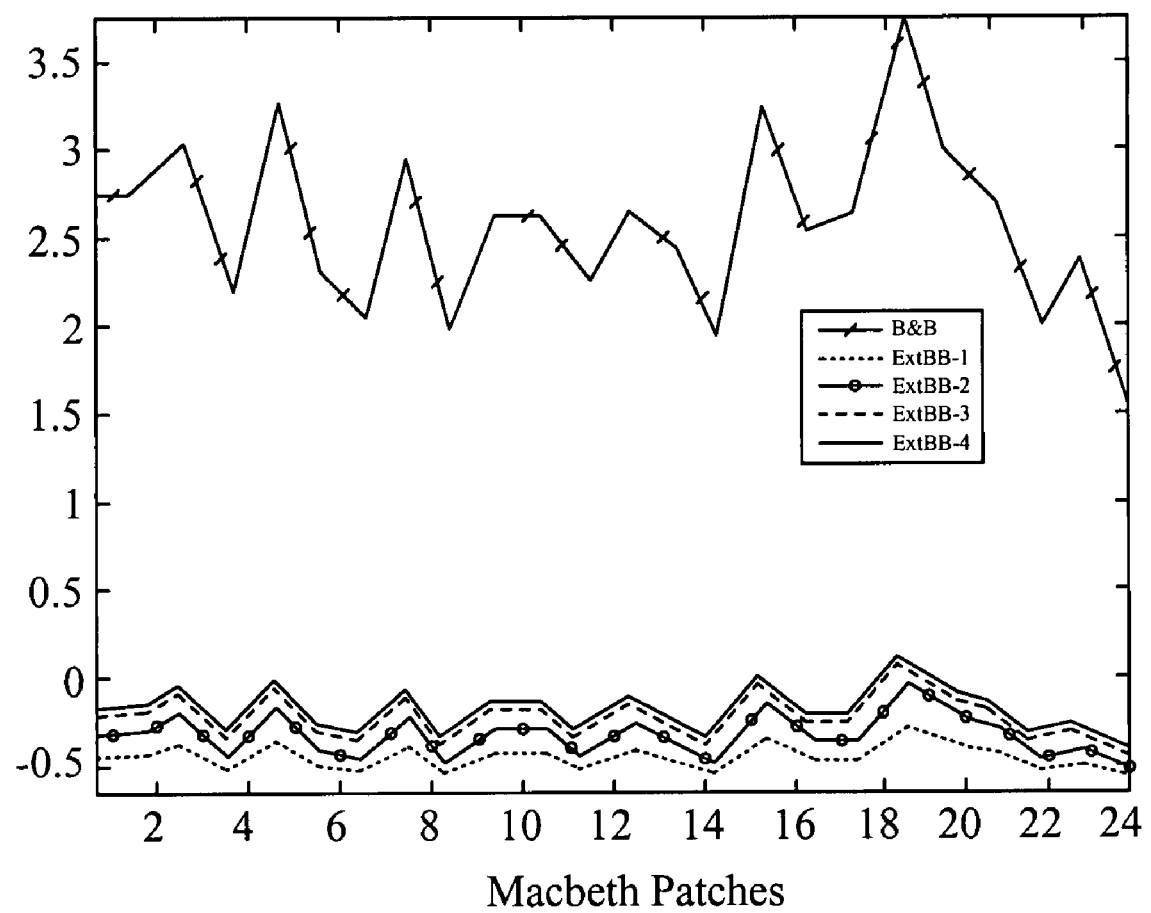
FIG. 9 illustrates a graphical representation of a comparison of the extended-B&B method and the B&B method.

From FIG. 9, it can be seen that noise propagation accuracy of the present scheme is highly superior to that of the B&B method. The present scheme efficiently incorporates the $C_b/C_r$ low-pass filter by decomposing the noise and the filter into sub-bands via ideal (or near-ideal) band-pass filtering and by assuming the noise to be bandwise-white. In contrast, the B&B method ignores the low-pass FIR filter. For simple setups, two sub-bands are sufficient.

Speech and Audio Processing

The presence of noise impedes the intelligibility of speech. For noise reduction algorithms to work, they need an accurate estimate of the noise present in the audio signal. Typically, the interfering noise is not white. The multi-band/multi-channel scheme is able to accurately predict sub-band noise in a fast way ensuring that the denoising algorithm is able to work to its full potential in real-time.

Seismic Wave Data Analysis

Multi-channel seismic data interpretation is used for imaging earth's interior and has applications in earthquake prediction, oil and gas exploration and oceanography. An important step in the analysis of such data is noise removal. Noise can be coherent, incoherent and impulsive. It is due to different physical processes such as air blast, ground roll, swell noise, multiple diffraction ship/rig noise, surface/diffraction noise and so on. Multi-channel data acquisition and processing methods are used to separate the image from the noisy observations. The signal processing operations include deconvolution, filtering and stacking amongst others. The present scheme is able to be used to efficiently and accurately predict multi-channel noise in various sub-bands to ensure accurate noise removal.

Medical Imaging

In medical imaging applications, image quality is very important. A significant consideration is noise analysis and removal. Image noise can have different characteristics. For instance, noise in magnetic resonance imaging is able to be signal dependent as well as signal independent. In general, noise is not stationary or white. The present noise analysis scheme is able to accurately predict noise in a fast way so that the noise is able to be removed.

Figure 11:
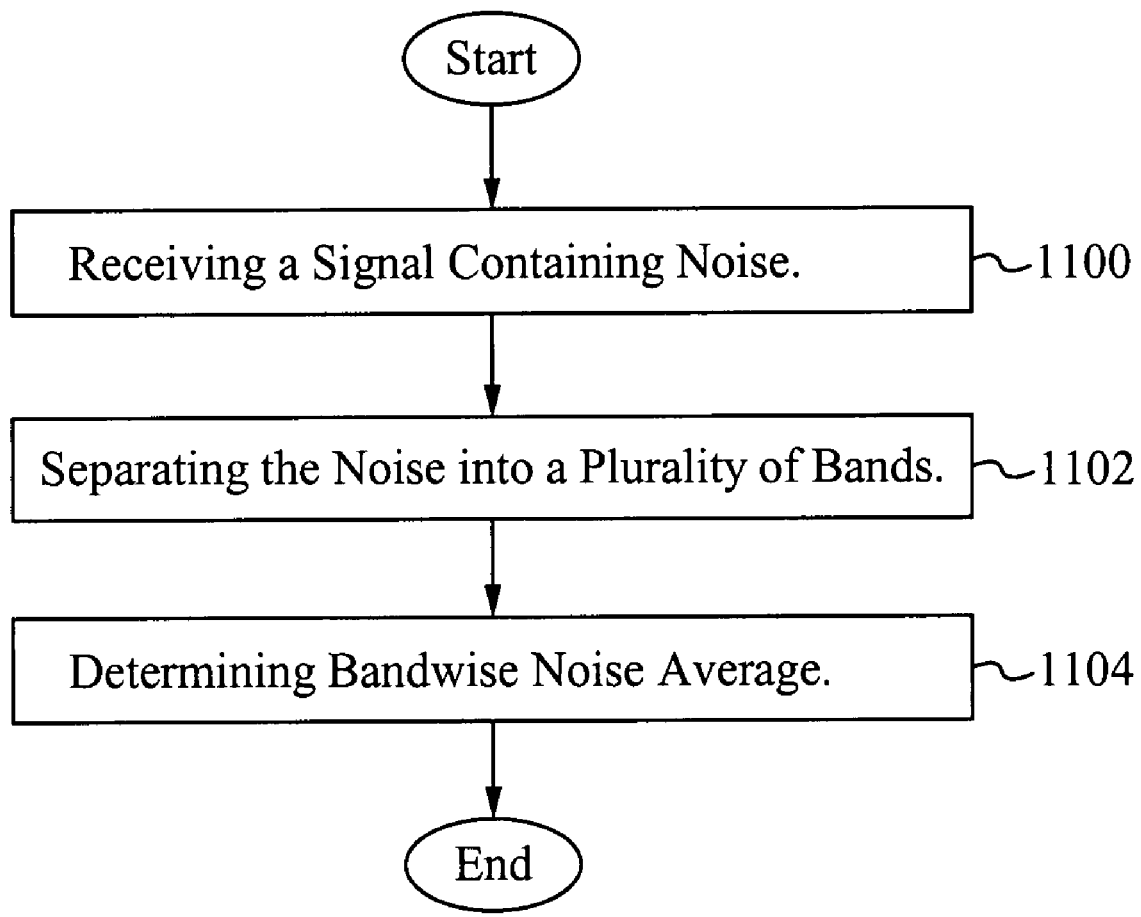
FIG. 11 illustrates a flowchart of a process of determining noise.

FIG. 11 illustrates a flowchart of a process of determining noise. In the step 1100, a signal is received or acquired wherein the signal contains noise. The signal is received or acquired at any device such as a digital camera, camcorder or any other computing device. In the step 1102, the noise is separated into a plurality of sub-bands. In the step 1104, the bandwise noise average is determined.

To utilize the noise analysis system and methodology, a device automatically analyzes noise in a more accurate and efficient manner. The device has access either internally or externally to the signal processing methodology described herein. The noise analysis methodology is able to be implemented in hardware, software or a combination of both and when noise is encountered, whatever desired operation, such as filtering, is carried out on the noise. Hardware components that are utilized when the method is implemented in hardware include a receiver for receiving a signal containing noise, a splitting/filtering component for splitting the noise into sub-bands and one or more processing components for receiving and propagating the noise. In some embodiments, a processing component is able to determine a threshold for each of the sub-bands in the plurality of sub-bands and filter the noise below the threshold.

In operation, the noise analysis system and methodology receives or acquires a signal containing noise. The noise is decomposed into 2 or more sub-bands for each channel. Then, analysis on each sub-band is able to occur. The noise analysis system and methodology allows fast and accurate propagation of any noise type such as white, colored, Gaussian and non-Gaussian.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of analyzing noise in a signal comprising:
   a. separating the noise into a plurality of sub-bands;
   b. determining a noise average for each of the sub-bands within the plurality of sub-bands;
   c. assuming the noise of each of the sub-bands to be white noise;
   d. predicting the noise utilizing a Jacobian matrix; and
   e. propagating the noise.

2. The method as claimed in claim 1 further comprising receiving the signal containing the noise.

3. The method as claimed in claim 1 wherein the plurality of sub-bands are for each channel within a multi-channel system.

4. The method as claimed in claim 1 wherein propagating the noise occurs in real-time.

5. The method as claimed in claim 1 wherein propagating the noise occurs offline.

6. The method as claimed in claim 1 wherein the method is applied in an application selected from the group consisting of digital image processing, sound processing, seismic wave data analysis and medical imaging.

7. The method as claimed in claim 1 wherein each of the sub-bands are of equal width.

8. The method as claimed in claim 1 wherein the plurality of sub-bands is between 2 and 4, inclusive.

9. The method as claimed in claim 1 wherein the noise is selected from the group consisting of white noise, colored noise, Gaussian noise and non-Gaussian noise.

10. A method of analyzing noise comprising:
    a. receiving a signal containing the noise;
    b. decomposing the noise in each channel into a plurality of sub-bands;
    c. determining a noise average for each of the plurality of sub-bands;
    d. assuming the noise of each of the sub-bands to be white noise;
    e. predicting the noise utilizing a Jacobian matrix; and
    f. propagating the noise.

11. The method as claimed in claim 10 wherein the plurality of sub-bands are for each channel within a multi-channel system.

12. The method as claimed in claim 10 wherein propagating the noise occurs in real-time.

13. The method as claimed in claim 10 wherein propagating the noise occurs offline.

14. The method as claimed in claim 10 wherein the method is applied in an application selected from the group consisting of digital image processing, sound processing, seismic wave data analysis and medical imaging.

15. The method as claimed in claim 10 wherein each of the sub-bands are of equal width.

16. The method as claimed in claim 10 wherein the plurality of sub-bands is between 2 and 4, inclusive.

17. The method as claimed in claim 10 wherein the noise is selected from the group consisting of white noise, colored noise, Gaussian noise and non-Gaussian noise.

18. A system for propagating noise in a plurality of sub-bands comprising:
   a. a splitting component for splitting the noise into the plurality of sub-bands; and
   b. one or more hardware processing components for receiving, assuming the noise of each of the sub-bands to be white noise, predicting the noise utilizing a Jacobian matrix and propagating the noise in the plurality of sub-bands.

19. The system as claimed in claim 18 wherein the splitting component comprises a low-pass filter and a subtractor for high pass filtering.

20. The system as claimed in claim 18 wherein the splitting component is a filter selected from the group consisting of ideal and near-ideal band pass filters.

21. The system as claimed in claim 18 wherein the splitting component is a look-up table.

22. The system as claimed in claim 18 wherein the plurality of sub-bands are each per a channel.

23. The system as claimed in claim 18 wherein the noise is selected from the group consisting of white noise, colored noise, Gaussian noise and non-Gaussian noise.

24. The system as claimed in claim 18 wherein at least one of Human Visual System (HVS) models and Human Auditory System (HAS) models are incorporated in the system.

25. A method of analyzing image noise in a signal comprising:
   a. separating the noise into a plurality of sub-bands using a prior knowledge of sub-band variances;
   b. determining a noise average for each of the sub-bands within the plurality of sub-bands;
   c. assuming the noise of each of the sub-bands to be white noise;
   d. predicting the noise utilizing a Jacobian matrix; and
   e. propagating the noise.

26. The method of claim 25 wherein the noise includes colored noise and white noise.

* * * * *